US011858175B2

(12) United States Patent
Maenishi et al.

(10) Patent No.: US 11,858,175 B2
(45) Date of Patent: Jan. 2, 2024

(54) CONTINUOUS KNEADING APPARATUS AND ITS CONTROL METHOD

(71) Applicant: THE JAPAN STEEL WORKS, LTD., Tokyo (JP)

(72) Inventors: Ryuichiro Maenishi, Tokyo (JP); Soma Tanaka, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 115 days.

(21) Appl. No.: 17/488,281

(22) Filed: Sep. 28, 2021

(65) Prior Publication Data

US 2022/0118653 A1   Apr. 21, 2022

(30) Foreign Application Priority Data

Oct. 20, 2020 (JP) .................................. 2020-175848

(51) Int. Cl.
*B29B 7/82* (2006.01)
*G05D 23/19* (2006.01)
*G05D 23/22* (2006.01)
*B29B 7/42* (2006.01)
(Continued)

(52) U.S. Cl.
CPC ................ *B29B 7/823* (2013.01); *B29B 7/42* (2013.01); *B29B 7/72* (2013.01); *B29B 7/826* (2013.01); *G05B 6/02* (2013.01); *G05D 23/1934* (2013.01); *G05D 23/22* (2013.01)

(58) Field of Classification Search
CPC .. B29B 7/823; B29B 7/42; B29B 7/72; B29B 7/826; B29B 7/726; B29B 7/423; G05B 6/02; G05D 23/1934; G05D 23/22; G05D 23/1917; B29C 2945/7604; B29C 2945/7619; B29C 45/78; B29C 45/47; B29C 45/62; B29C 45/74
See application file for complete search history.

(56) References Cited

U.S. PATENT DOCUMENTS

| 5,597,588 A | * | 1/1997 | Totani | ..................... B29C 45/78 |
| | | | | 425/143 |
| 2017/0031330 A1 | * | 2/2017 | Shiraishi | ............... B29C 45/762 |
| 2019/0294153 A1 | * | 9/2019 | Yamaguchi | ............... H02P 6/08 |

FOREIGN PATENT DOCUMENTS

JP       2009-172822 A       8/2009

OTHER PUBLICATIONS

Yukkiang Lau, "Injection molding machine and method" (English translation/Original document for Application KR2006-0082870), Jul. 19, 2006, ip.com machine translation (Year: 2006).*

(Continued)

*Primary Examiner* — Christopher E. Everett
*Assistant Examiner* — Christopher W Carter
(74) *Attorney, Agent, or Firm* — Potomac Law Group, PLLC

(57) ABSTRACT

In a continuous kneading apparatus according to an embodiment, for each of a plurality of ring-shaped heaters, a control unit determines a current state and a reward for an action selected in the past based on a control error calculated from an acquired temperature; updates a control condition based on the reward, and determines an optimum action corresponding to the current state under the updated control condition, the control condition being a combination of a state and an action; and controls a target ring-shaped heater based on the optimum action.

10 Claims, 6 Drawing Sheets

(51) Int. Cl.
*B29B 7/72* (2006.01)
*G05B 6/02* (2006.01)

(56) References Cited

OTHER PUBLICATIONS

Takamitsu Ito, "Automatic temperature rise control method for molding machine" (English translation/Original document for Application JP 2011-230381), Nov. 17, 2011, ip.com machine translation (Year: 2011).*

Tsukasa Shiroganeya, "Structure of thermocouple mounting part in heating cylinder" (English translation/Original document for Application JP 3167292), May 21, 2001, ip.com machine translation (Year: 2001).*

* cited by examiner

CONTINUOUS KNEADING APPARATUS AND ITS CONTROL METHOD

INCORPORATION BY REFERENCE

This application is based upon and claims the benefit of priority from Japanese patent application No. 2020-175848, filed on Oct. 20, 2020, the disclosure of which is incorporated herein in its entirety by reference.

BACKGROUND

The present disclosure relates to a continuous kneading apparatus and its control method.

Injection molding apparatuses and extrusion molding apparatuses for resins are equipped with a continuous kneading apparatus that kneads resin pellets charged into a cylinder by using a screw while heating the pellets by using a heater. For example, Japanese Unexamined Patent Application Publication No. 2009-172822 discloses an injection molding apparatus equipped with a continuous kneading apparatus that performs feedback control for a heater based on a measured temperature.

SUMMARY

The inventors of the present application have found various problems in the development of a continuous kneading apparatus that performs feedback control for a heater based on a measured temperature.

Other problems and novel features will be clarified from the descriptions in this specification and the attached drawings.

In a continuous kneading apparatus according to an embodiment, for each of a plurality of ring-shaped heaters, a control unit determines a current state and a reward for an action selected in the past based on a control error calculated from a measured temperature; updates a control condition based on the reward, and determines an optimum action corresponding to the current state under the updated control condition, the control condition being a combination of a state and an action; and controls a target ring-shaped heater based on the optimum action.

According to the above-described embodiment, it is possible to provide an excellent continuous kneading apparatus.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments are explained hereinafter in detail with reference to the drawings. However, the present disclosure is not limited to the below-shown embodiments. Further, the following descriptions and the drawings are simplified as appropriate for clarifying the explanation.

First Embodiment

<Configuration of Continuous Kneading Apparatus>

Firstly, a configuration of a continuous kneading apparatus and an injection molding apparatus including the continuous kneading apparatus according to a first embodiment will be described with reference to FIGS. 1 to 3. Each of FIGS. 1 to 3 is a schematic cross-sectional view showing a configuration of the continuous kneading apparatus and the injection molding apparatus including the continuous kneading apparatus according to the first embodiment.

Figure 1:
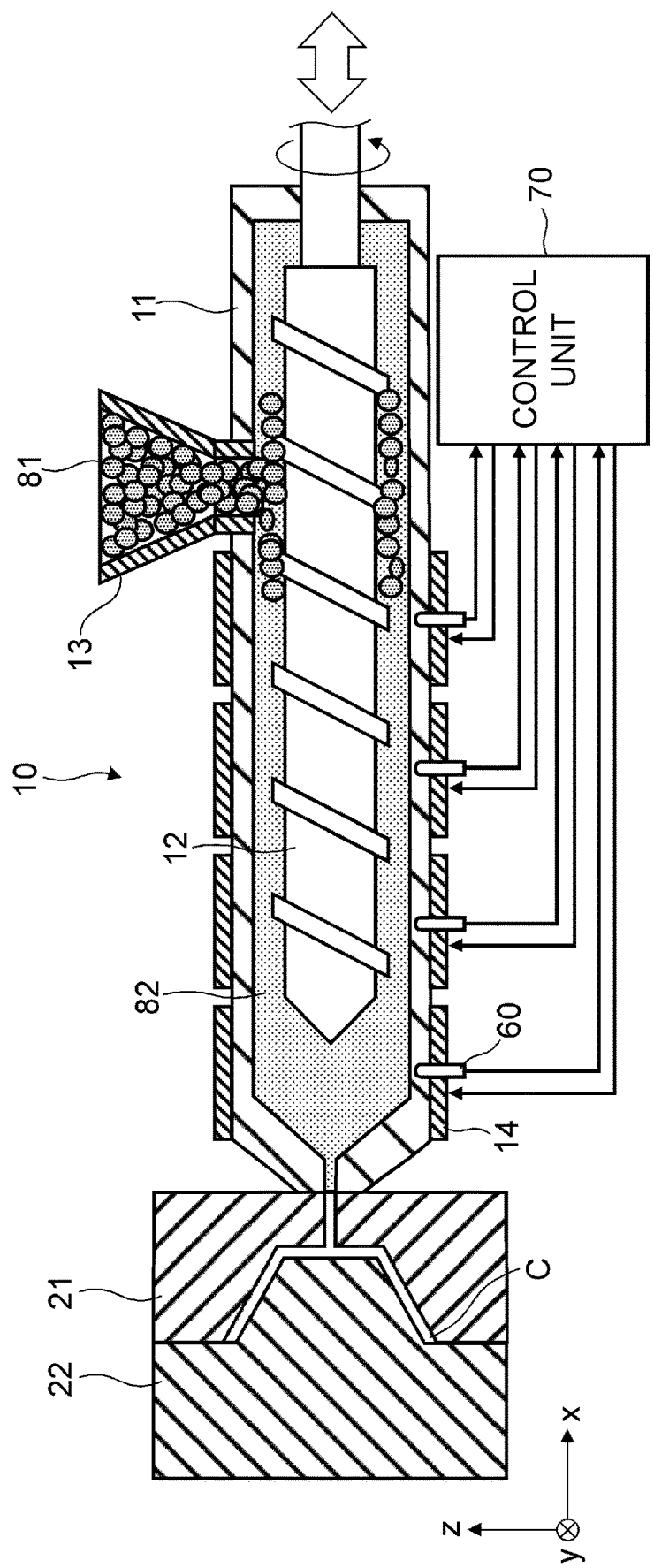
FIG. 1 is a schematic cross-sectional view showing a configuration of a continuous kneading apparatus and an injection molding apparatus including the continuous kneading apparatus according to a first embodiment.
Figure 2:
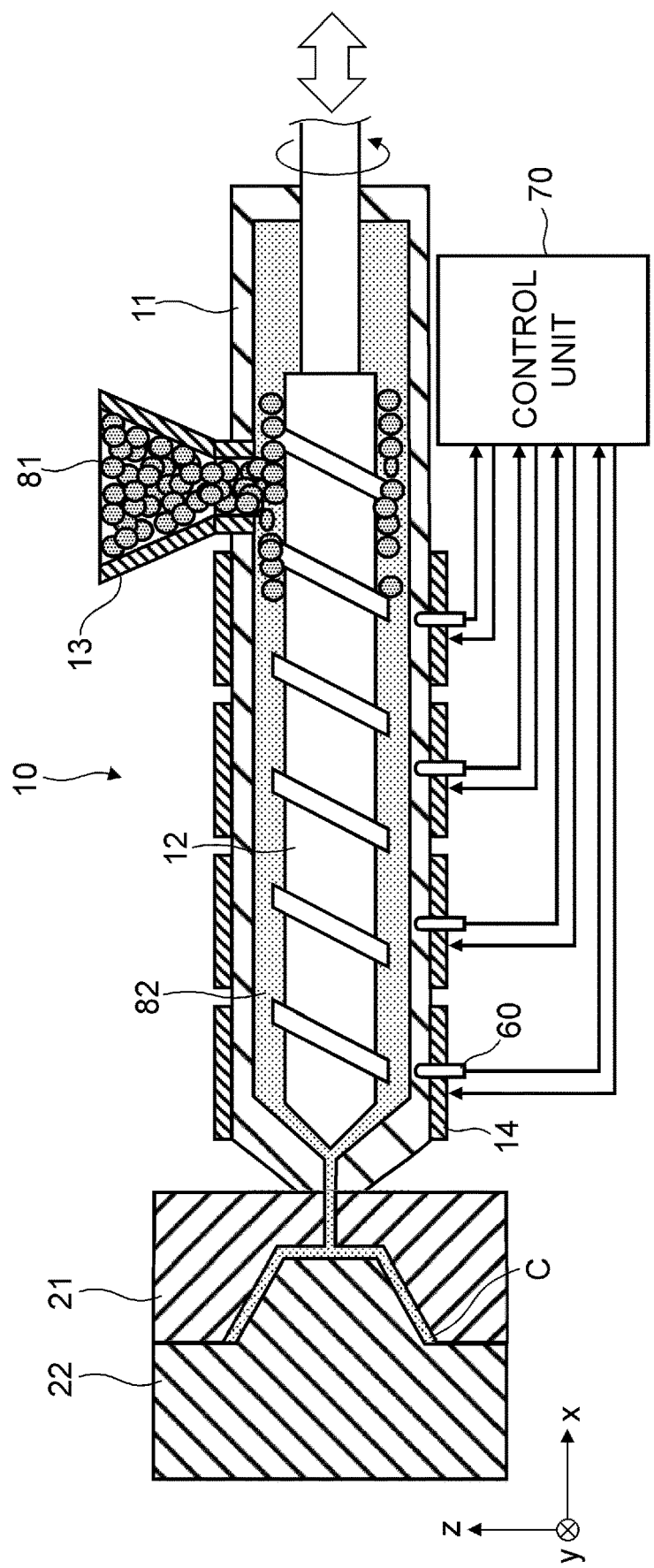
FIG. 2 is a schematic cross-sectional view showing a configuration of the continuous kneading apparatus and the injection molding apparatus including the continuous kneading apparatus according to the first embodiment.
Figure 3:
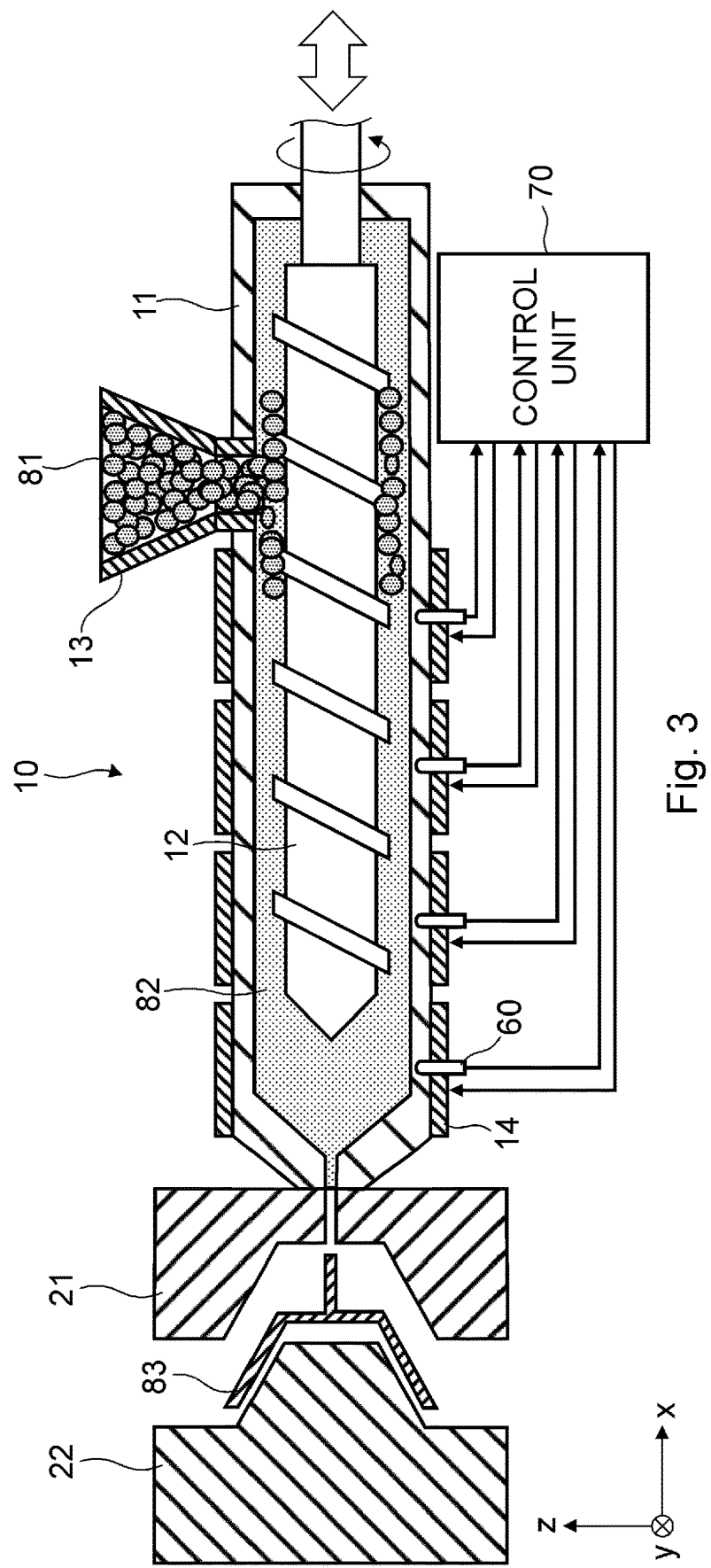
FIG. 3 is a schematic cross-sectional view showing a configuration of the continuous kneading apparatus and the injection molding apparatus including the continuous kneading apparatus according to the first embodiment.

Note that, needless to say, right-handed xyz-orthogonal coordinates shown in FIGS. 1 to 3 are shown for the sake of convenience for explaining the positional relation among components. In general, the z-axis positive direction is the vertically upward direction and the xy-plane is a horizontal plane throughout the drawings.

As shown in FIGS. 1 to 3, the continuous kneading apparatus 10 according to the first embodiment includes a cylinder 11, a screw 12, a hopper 13, ring-shaped heaters 14, temperature sensors 60, and a control unit 70. In addition to the continuous kneading apparatus 10, the injection molding apparatus includes a fixed die 21 and a movable die 22.

FIG. 1 shows the injection molding apparatus in a state immediately before a molten resin 82 is injected into a cavity C formed by the dies (the fixed die 21 and movable die 22).

FIG. 2 shows the injection molding apparatus in a state after the injection of the molten resin 82 into the cavity C of the dies has been completed.

FIG. 3 shows the injection molding apparatus in a state when a resin molded article 83 is removed from the dies.

The cylinder 11 is a cylindrical member extending in the x-axis direction.

The screw 12 is disposed so as to extend in the x-axis direction, and is rotatably housed inside the cylinder 11. Although not shown in the drawings, for example, a motor is connected to the screw 12 as a rotational driving source with a speed reducer interposed therebetween. Further, the screw 12 can be moved in the x-axis direction by an actuator (not shown). As shown in FIG. 2, as the screw 12 moves forward in the X-axis negative direction, the molten resin 82 is injected into the inside of the dies (the fixed die 21 and movable die 22).

The hopper 13 is a cylindrical member for charging resin pellets 81, which are a raw material for the resin molded article 83 shown in FIG. 3, into the inside of the cylinder 11. The hopper 13 is disposed in the upper side of an end part of the cylinder 11 on the positive side in the X-axis direction.

The ring-shaped heaters 14 are arranged along the longitudinal direction (the x-axis direction) of the cylinder 11 so as to cover the outer peripheral surface of the cylinder 11. In the example shown in FIGS. 1 to 3, four ring-shaped heaters 14 are provided on the distal-end side (the negative side in the x-axis direction) of the hopper 13. Each of the plurality of ring-shaped heaters 14 is individually controlled by the control unit 70.

Each of the temperature sensors 60 measures a temperature of a part of the cylinder 11 heated by a respective one of the plurality of ring-shaped heaters 14. Each of the temperature sensors 60 is, for example, a thermocouple. In the examples shown in FIGS. 1 to 3, each of the temperature sensors 60 is inserted into a through hole formed in a respective one of the ring-shaped heaters 14, and is positioned so as to be in contact with the cylinder 11.

The control unit 70 learns a control condition(s) for each of the ring-shaped heaters 14 while performing feedback controlling for a respective one of the ring-shaped heaters 14 based on a temperature measured by a respective one of the temperature sensors 60. More specifically, the control unit 70 controls the output of each of the ring-shaped heaters 14 so that a temperature measured by a respective one of the temperature sensors 60 gets closer to a set temperature (a target temperature).

Note that the configuration and the operation of the control unit 70 will be described later in a more detailed manner.

In the continuous kneading apparatus 10 according to the first embodiment, resin pellets 81 supplied from the hopper 13 are kneaded by the rotating screw 12 inside the cylinder 11 while being heated by the ring-shaped heaters 14. Since the resin pellets 81 are heated and extruded (i.e., pressed) from the base of the screw 12 toward the tip thereof (in the x-axis negative direction), they are compressed and transformed into a molten resin 82.

The fixed die 21 is a die fixed to the tip of the continuous kneading apparatus 10. Meanwhile, the movable die 22 is a die that is driven by a driving source (not shown) and can slide in the x-axis direction. As the movable die 22 moves in the x-axis positive direction and abuts on the fixed die 21, as shown in FIG. 1, a cavity C whose shape conforms to the shape of s resin molded article 83 to be manufactured (see FIG. 3) is formed between the fixed die 21 and the movable die 22.

Next, as shown in FIG. 2, the screw 12 moves forward in the x-axis negative direction and the molten resin 82 is charged into the cavity C, so that the resin molded article 83 (see FIG. 3) is molded.

Then, as shown in FIG. 3, the screw 12 retreats in the x-axis positive direction and the movable die 22 moves in the x-axis negative direction and thereby is released (i.e., separated) from the fixed die 21, so that the resin molded article 83 is removed.

<Configuration of Control Unit 70 According to Comparative Example>

A continuous kneading apparatus according to a comparative example has an overall configuration similar to that of the continuous kneading apparatus according to the first embodiment shown in FIGS. 1 to 3. In the comparative example, the control unit 70 performs, by using PID control, feedback control for each of the ring-shaped heaters 14 based on a temperature acquired from a respective one of the temperature sensors 60. In the case of the PID control, it is necessary to adjust a parameter(s) every time a process condition(s) is changed. In general, an operator adjusts the parameter(s) through trial and error, thus causing a problem that a large amount of time is taken and a large amount of resin material is required to adjust the parameter(s).

<Configuration of Control Unit 70 According to First Embodiment>

Figure 4:
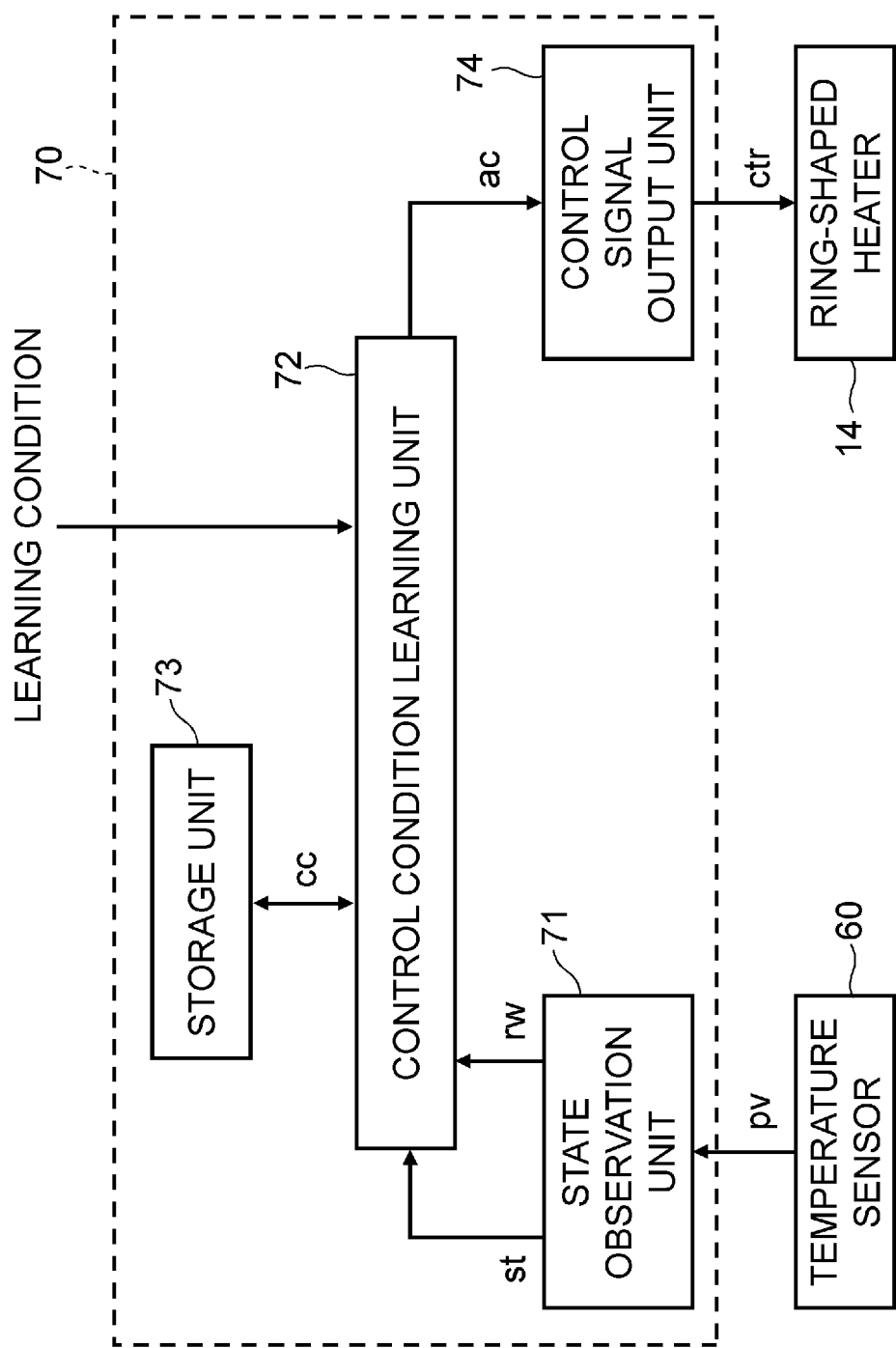
FIG. 4 is a block diagram showing a configuration of a control unit 70 according to the first embodiment.

Next, the configuration of the control unit 70 according to the first embodiment will be described in a more detailed manner with reference to FIG. 4. FIG. 4 is a block diagram showing the configuration of the control unit 70 according to the first embodiment. As shown in FIG. 4, the control unit 70 according to the first embodiment includes a state observation unit 71, a control condition learning unit 72, a storage unit 73, and a control signal output unit 74.

Note that each of the functional blocks constituting the control unit 70 can be implemented by hardware such as a CPU (Central Processing Unit), a memory, and other circuits, or can be implemented by software such as a program(s) loaded in a memory or the like. Therefore, each functional block can be implemented in various forms by computer hardware, software, or combinations thereof.

The state observation unit 71 calculates a control error of each of the ring-shaped heaters 14 from a measured temperature value pv acquired from a respective one of the temperature sensors 60. The control error is a difference between a target value and a measured value pv. Note that the target value is a target temperature set for each of the ring-shaped heaters 14. Meanwhile, the measured value pv is a measured temperature value acquired from a temperature sensor 60 corresponding to the target ring-shaped heater 14.

Then, the state observation unit 71 determines, for each of the ring-shaped heaters 14, a current state st and a reward rw for an action ac selected in the past (e.g., selected in the last time) based on the calculated control error.

The state st is defined in advance in order to classify values of the control error, which can take any of infinite number of values, into a finite number of groups. As a simple example for an explanatory purpose, when the control error is represented by err, for example, a range "$-4.0°\ C. \le err < -3.0°\ C.$" is defined as a state st1; a range "$-3.0°\ C. \le err < -2.0°\ C.$" is defined as a state st2; a range "$-2.0°\ C. \le err < -1.0°\ C.$" is defined as a state st3; a range "$-1.0°\ C. \le err < 1.0°\ C.$" is defined as a state st4; a range "$1.0°\ C. \le err < 2.0°\ C.$" is defined as a state st5; a range "$2.0°\ C. \le err < 3.0°\ C.$" is defined as a state st6; a range "$3.0°\ C. \le err < 4.0°\ C.$" is defined as a state st7; and a range "$4.0°\ C. \le err < 5.0°\ C.$" is defined as a state st8. In practice, in many cases, a larger number of states st each having a narrower range may be defined.

The reward rw is an index for evaluating an action ac that was selected in a past state st.

Specifically, when the absolute value of the calculated current control error is smaller than the absolute value of the past control error, the state observation unit 71 determines that the action ac selected in the past is appropriate and sets, for example, a positive value to the reward rw. In other words, the reward rw is determined so that the previously selected action ac is more likely to be selected again in the same state st as the past state.

On the other hand, when the absolute value of the calculated current control error is larger than the absolute value of the past control error, the state observation unit 71 determines that the action ac selected in the past is inappropriate and sets, for example, a negative value to the reward rw. In other words, the reward rw is determined so that the previously selected action ac is less likely to be selected again in the same state st as the past state.

Note that specific examples of the reward rw will be described later. Further, the value of the reward rw can be determined as appropriate. For example, the reward rw may have a positive value at all times, or the reward rw may have a negative value at all times.

The control condition learning unit 72 performs reinforcement learning for each of the ring-shaped heaters 14. Specifically, the control condition learning unit 72 updates a control condition (a learning result) based on the reward rw, and selects an optimum action ac corresponding to the current state st under the updated control condition. The control condition is a combination of a state st and an action ac. Table 1 shows simple control conditions (learning results) corresponding to the above-described states st1 to st8. In the example shown in FIG. 4, the control condition learning unit 72 stores the updated control condition cc in the storage unit 73, which is, for example, a memory, and updates the control condition cc by reading it from the storage unit 73.

as the initial value. Further, for example, the states st1 to st8 and the actions ac1 to ac5 shown in the Table 1 are included in the learning condition shown in FIG. 4.

The quality Q will be described by using the state st7 in the Table 1 as an example. In the state st7, since the control error is no lower than 3.0° C. and lower than 4.0° C., the heating temperature by the target ring-shaped heater 14 is too high. Therefore, it is necessary to reduce the output of the target ring-shaped heater 14. Therefore, as a result of the learning by the control condition learning unit 72, the qualities Q of the actions ac1 and ac2 for reducing the output to the ring-shaped heater 14 are larger. Meanwhile, the qualities Q of the actions ac4 and ac5 for increasing the output to the ring-shaped heater 14 are smaller.

In the example shown in Table 1, for example, when the control error is 3.5° C., the state st falls in the state st7. Therefore, the control condition learning unit 72 selects the

TABLE 1

|  | st1<br>−4.0~−3.0° C. | st2<br>−3.0~−2.0° C. | st3<br>−2.0~−1.0° C. | st4<br>−1.0~1.0° C. | st5<br>1.0~2.0° C. | st6<br>2.0~3.0° C. | st7<br>3.0~4.0° C. | st8<br>4.0~5.0° C. |
|---|---|---|---|---|---|---|---|---|
| ac1<br>−1.0% | −4.6 | −4.2 | −4.2 | −3.2 | −2.5 | +0.3 | +2.6 | +5.2 |
| ac2<br>−0.5% | −6.2 | −5.2 | +1.5 | +2.5 | +3.0 | +3.5 | +3.6 | +3.2 |
| ac3<br>0% | −2.2 | −1.5 | +2.2 | +5.2 | +2.3 | +2.0 | +0.1 | −2.3 |
| ac4<br>+0.5% | +4.2 | +4.6 | +4.4 | +2.5 | −0.2 | −0.8 | −2.2 | −3.5 |
| ac5<br>+1.0% | +5.5 | +4.2 | +3.5 | +2.2 | −3.0 | −4.4 | −4.6 | −5.2 |

The Table 1 shows control conditions (learning results) by Q learning, which is an example of the reinforcement learning. The aforementioned eight states st1 to st8 are shown in the uppermost row in the Table 1. That is, the eight states st1 to st8 are shown in the second to ninth columns, respectively. Meanwhile, five actions ac1 to ac5 are shown in the leftmost column in the Table 1. That is, the five actions ac1 to ac5 are shown in the second to sixth rows, respectively.

Note that, in the example shown in Table 1, an action for reducing the output (e.g., the voltage) to the ring-shaped heater 14 by 1.0% is defined as the action ac1 (Output Change: −1%). An action for reducing the output (e.g., the voltage) to the ring-shaped heater 14 by 0.5% is defined as the action ac2 (Output Change: −0.5%). An action for maintaining the output to the ring-shaped heater 14 is defined as the action ac3 (Output Change: 0%). An action for increasing the output to the ring-shaped heater 14 by 0.5% is defined as the action ac4 (Output Change: +0.5%). An action for increasing the output to the ring-shaped heater 14 by 1.0% is defined as the action ac5 (Output Change: +1.0%). The example shown in the Table 1 is merely a simple example for an explanatory purpose. That is, in practice, in many cases, a larger number of more detailed actions ac may be defined.

A value determined by a combination of a state st and an action ac in the Table 1 is called a quality Q (st, ac). After an initial value is given, the quality Q is successively updated based on the reward rw by using a known updating formula. The initial value of the quality Q is included in, for example, the learning condition shown in FIG. 4. The learning condition is input by, for example, an operator. The initial value of the quality Q may be stored in the storage unit 73, and for example, a learning result in the past may be used optimum action ac2 having the highest quality Q in the state st7, and outputs the selected action ac2 to the control signal output unit 74. The control signal output unit 74 reduces a control signal ctr output to the ring-shaped heater 14 by 0.5% based on the action ac2 received from the control condition learning unit 72.

The control signal ctr is, for example, a voltage signal.

Then, when the absolute value of the next control error is smaller than the absolute value 3.5° C. of the current control error, the state observation unit 71 determines that the selecting of the action ac2 in the current state st7 is appropriate, and outputs a reward rw having a positive value. Therefore, the control condition learning unit 72 updates the control condition so as to increase the quality +3.6 of the action ac2 in the state st7 according to the reward rw. As a result, in the case of the state st7, the control condition learning unit 72 continuously selects the action ac2.

On the other hand, when the absolute value of the next control error is larger than the absolute value 3.5° C. of the current control error, the state observation unit 71 determines that the selecting of the action ac2 in the current state st7 is inappropriate, and outputs a reward rw having a negative value. Therefore, the control condition learning unit 72 updates the control condition so as to reduce the quality +3.6 of the action ac2 in the state st7 according to the reward rw. As a result, in the case of the state st7, when the quality of the action ac2 in the state st7 becomes smaller than the quality +2.6 of the action ac1, the control condition learning unit 72 selects the action ac1 instead of the action ac2.

Note that the timing of the updating of the control condition is not limited to the next time (e.g., not limited to when the control error is calculated the next time). That is, the timing of the updating may be determined as appropriate while taking a time lag or the like into consideration. Further, in the initial stage of the learning, the action ac may be randomly selected in order to expedite the learning. Further, although the reinforcement learning by simple Q learning is described above with reference to the Table 1, there are various types of learning algorithms such as Q learning, AC (Actor-Critic) method, TD learning, and Monte Carlo method, and the learning algorithm is not limited to in any type of algorithms. For example, when the number of states st and actions ac increase and the number of combinations thereof explosively increases, the algorithm may be selected, such as using the AC method, according to the situation.

Further, in the AC method, a probability distribution function is used as a policy function in many cases. The probability distribution function is not limited to the normal distribution function. For example, for the purpose of simplification, a sigmoid function, a soft max function, or the like may be used. The sigmoid function is a function that is used most commonly in neural networks. Because the reinforcement learning is one of the types of the machine learning that is the same as the neural network, it can use the sigmoid function. Further, the sigmoid function has another advantage that the function itself is simple and easily handled.

As described above, there are various learning algorithms and functions to be used, and an optimum algorithm and an optimum function may be selected as appropriate for the process.

As described above, the PID control is not used in the continuous kneading apparatus according to the first embodiment. Therefore, to begin with, there is no need to adjust a parameter(s) which would otherwise be necessary when a process condition is changed. Further, the control unit 70 updates the control condition (the learning result) based on the reward rw through the reinforcement learning, and selects an optimum action ac corresponding to the current state st under the updated control condition. Therefore, even when a process condition(s) is changed, it is possible reduce the time taken for the adjustment and the amount of a resin material required therefor as compared to those in the comparative example.

Note that the application of the continuous kneading apparatus 10 according to the first embodiment is not limited to those for injection molding apparatuses. That is, the continuous kneading apparatus 10 may also be used in extrusion molding apparatuses. In the case of an extrusion molding apparatus, since the injecting operation in the continuous kneading apparatus 10 is unnecessary, the screw 12 does not have to be movable in the x-axis direction. The rest of the configuration in the continuous kneading apparatus 10 in the injection molding apparatus and that in the extrusion molding apparatus are roughly similar to each other.

<Control Method for Continuous Kneading Apparatus>

Figure 5:
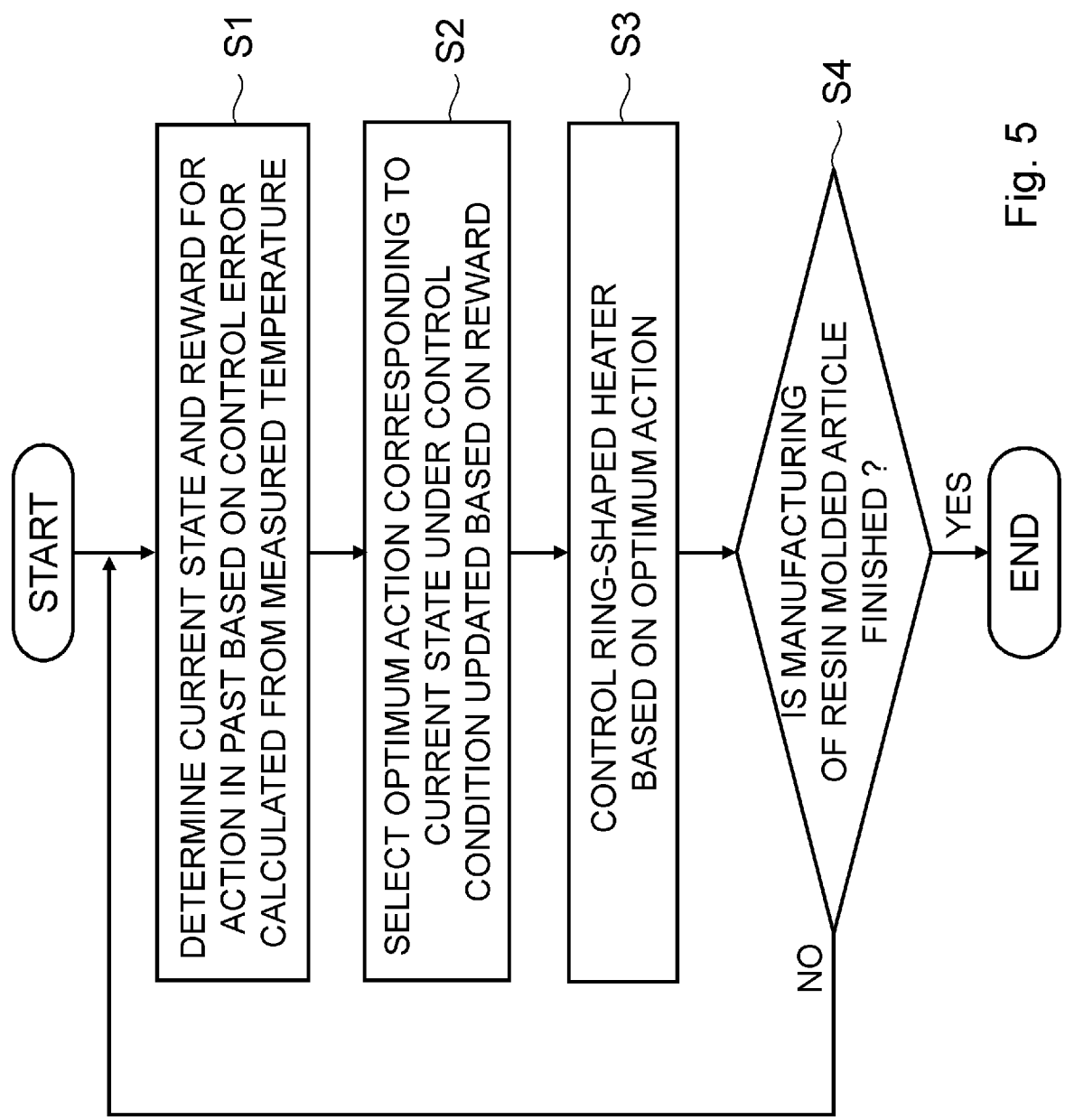
FIG. 5 is a flowchart showing a method for controlling the continuous kneading apparatus according to the first embodiment.

Next, a method for controlling the continuous kneading apparatus according to the first embodiment will be described in detail with reference to FIG. 5. FIG. 5 is a flowchart showing a method for controlling the continuous kneading apparatus according to the first embodiment. The following description will be given while referring to FIG. 4 as appropriate as well as referring to FIG. 5.

Firstly, as shown in FIG. 5, the state observation unit 71 of the control unit 70 shown in FIG. 4 calculates, for each ring-shaped heater 14, a control error from a temperature measured by a respective one of the temperature sensors 60. Then, based on the calculated control error, the state observation unit 71 determines a current state st and a reward rw for an action ac selected in the past (Step S1). Note that, at the start of the control, since there is no action ac selected in the past (e.g., no action ac selected in the last control) and hence it is impossible to determine the reward rw. Therefore, only the current state st at the start of the control is determined.

Next, as shown in FIG. 5, the control condition learning unit 72 of the control unit 70 updates a control condition, which is a combination of a state st and an action ac, based on the reward rw. Then, the control condition learning unit 72 selects an optimum action ac corresponding to the current state st under the updated control condition (Step S2). Note that, at the start of the control, the control condition is not updated and remains as the initial value, but the optimum action ac corresponding to the state st at the start of the control is selected.

Then, as shown in FIG. 5, the control signal output unit 74 of the control unit 70 outputs a control signal ctr to the ring-shaped heater 14 based on the optimum action ac selected by the control condition learning unit 72 (Step S3).

When the manufacturing of the resin molded article 83 has not been completed yet (Step S4 No), the process returns to the step S1 and the control is continued. On the other hand, when the manufacturing of the resin molded article 83 has been completed (Step S4 YES), the control is finished. That is, the steps S1 to S3 are repeated until the manufacturing of the resin molded article 83 is completed.

As described above, the PID control is not used in the continuous kneading apparatus 10 according to the first embodiment. Therefore, to begin with, there is no need to adjust a parameter(s) which would otherwise be necessary when a process condition(s) is changed. Further, the control condition (the learning result) is updated based on the reward rw through the reinforcement learning using a computer, and an optimum action ac corresponding to the current state st is selected under the updated control condition. Therefore, even when a process condition(s) is changed, it is possible reduce the time taken for the adjustment and the amount of a resin material required therefor as compared to those in the comparative example.

Second Embodiment

Next, a continuous kneading apparatus according to a second embodiment will be described with reference to FIG. 6. The overall configuration of the continuous kneading apparatus according to the second embodiment is similar to that of the continuous kneading apparatus according to the first embodiment shown in FIGS. 1 to 3, and therefore the description thereof will be omitted. The configuration of the control unit 70 in the continuous kneading apparatus according to the second embodiment differs from that in the continuous kneading apparatus according to the first embodiment.

Figure 6:
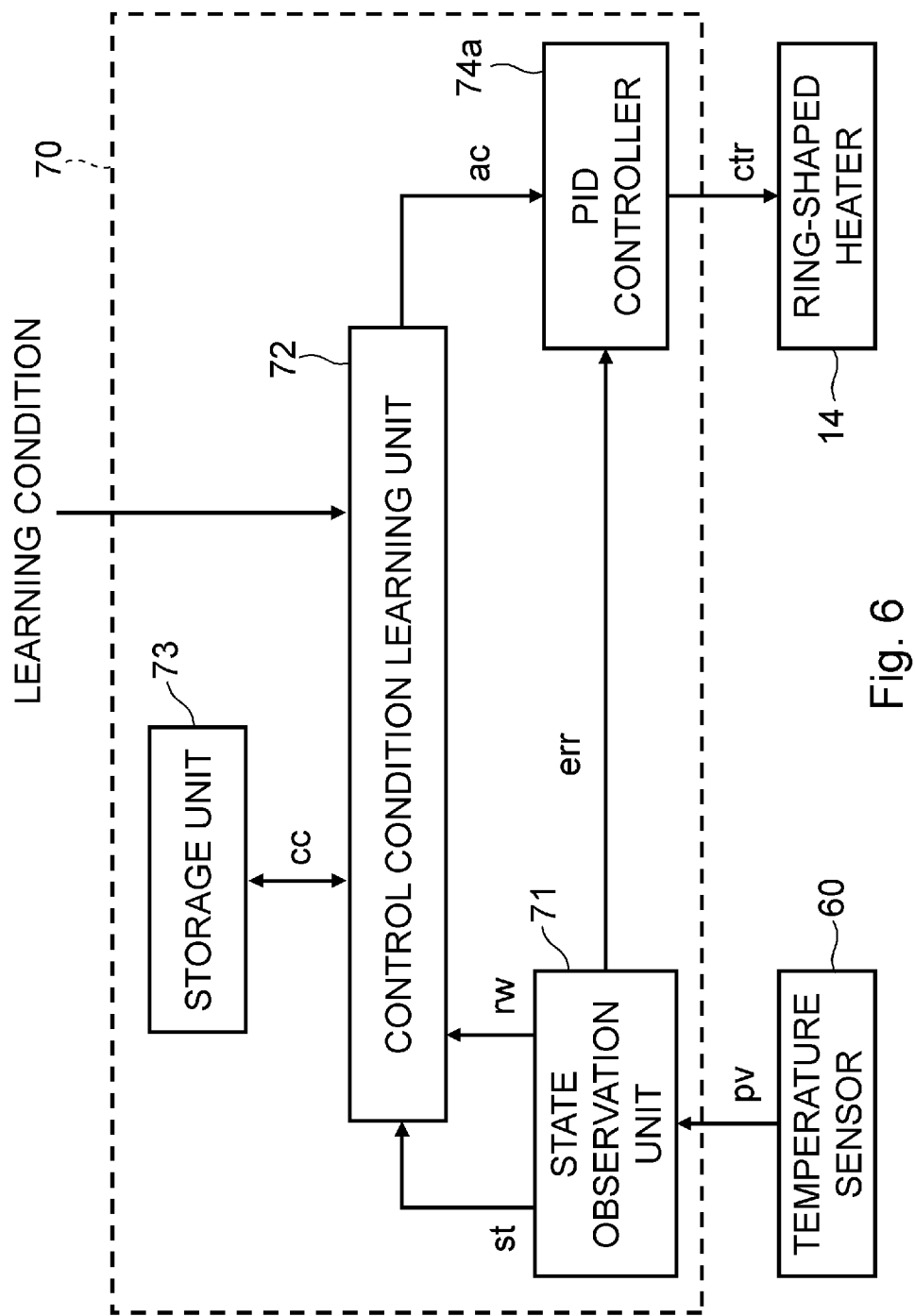
FIG. 6 is a block diagram showing a configuration of a control unit 70 according to a second embodiment.

FIG. 6 is a block diagram showing the configuration of the control unit 70 according to the second embodiment. As shown in FIG. 6, the control section 70 according to the second embodiment includes a state observation unit 71, a control condition learning unit 72, a storage unit 73, and a PID controller 74a. That is, the control unit 70 according to the second embodiment includes the PID controller 74a as the control signal output unit 74 in the control unit 70 according to the first embodiment shown in FIG. 4. The PID controller 74a is also an example of the control signal output unit.

Similarly to the first embodiment, the state observation unit 71 determines, for each ring-shaped heater 14, a current state st and a reward rw for an action ac selected in the past based on the calculated control error err. Then, the state observation unit 71 outputs the current state st and the reward rw to the control condition learning unit 72. Further, the state observation unit 71 according to the second embodiment outputs the calculated control error err to the PID controller 74a.

Similarly to the first embodiment, the control condition learning unit 72 also performs reinforcement learning for each ring-shaped heater 14. Specifically, the control condition learning unit 72 updates a control condition (a learning result) based on the reward rw, and selects an optimum action ac corresponding to the current state st under the updated control condition. Note that, in the first embodiment, the output to the ring-shaped heater 14 is directly changed according to the content (i.e., the details) of the action ac selected by the control condition learning unit 72. In contrast, in the second embodiment, a parameter(s) of the PID controller 74a is changed according to the content (e.g., the details) of the action ac selected by the control condition learning unit 72.

As shown in FIG. 6, the parameter of the PID controller 74a is successively changed based on the action ac output from the control condition learning unit 72. Meanwhile, the PID controller 74a outputs a control signal ctr to the ring-shaped heater 14 based on the control error err received from the state observation unit 71. The control signal ctr is, for example, a voltage signal.

The rest of the configuration is similar to that of the first embodiment, and therefore the description thereof will be omitted.

As described above, in the continuous kneading apparatus according to the second embodiment, PID control is used, so that it is necessary to adjust a parameter(s) when a process condition(s) is changed. In the continuous kneading apparatus according to the second embodiment, the control unit 70 updates the control condition (the learning result) based on the reward rw through the reinforcement learning, and selects an optimum action ac corresponding to the current state st under the updated control condition. Note that the action ac in the reinforcement learning is to change a parameter of the PID controller 74a. Therefore, even when a process condition(s) is changed, it is possible to reduce the time taken for the adjustment of the parameter and the amount of a resin material required therefor as compared to those in the comparative example.

In the above-described examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A continuous kneading apparatus comprising:
   a cylinder;
   a screw housed in the cylinder;
   a plurality of ring-shaped heaters arranged along a longitudinal direction of the cylinder so as to cover an outer peripheral surface of the cylinder;
   a plurality of temperature sensors, each of the plurality of temperature sensors being configured to measure a temperature of a part of the cylinder heated by a respective one of the plurality of ring-shaped heaters; and
   a controller configured to perform feedback control for each of the plurality of ring-shaped heaters based on the temperature measured by a respective one of the plurality of temperature sensors,
   wherein resin pellets charged into the cylinder are kneaded by the screw while being heated by the plurality of ring-shaped heaters, and
   wherein, for each of the plurality of ring-shaped heaters, the controller:
   calculates a control error from the temperature measured by the temperature sensor;
   determines a current state and a reward based on the calculated control error;
   updates a control condition based on the determined reward and selects an action corresponding to the current state under the updated control condition, the updated control condition being a combination of a state and the selected action; and
   controls the respective ring-shaped heater based on the selected action,
   wherein the state represents a predetermined range of control error values, and the current state is the state that represents the range that includes the calculated control error, and
   the reward indicates appropriateness of the selected action selected in a previous state previous to the current state.

2. The continuous kneading apparatus according to claim 1, wherein the action is a change in an output of the target ring-shaped heater.

3. The continuous kneading apparatus according to claim 1, wherein the action is a change in a parameter of a PID controller configured to control an output of the target ring-shaped heater.

4. The continuous kneading apparatus according to claim 1, wherein each of the plurality of temperature sensors is a thermocouple.

5. The continuous kneading apparatus according to claim 4, wherein each of the thermocouples is inserted into a through hole formed in a respective one of the plurality of ring-shaped heaters, and is positioned so as to be in contact with the cylinder.

6. A method for controlling a continuous kneading apparatus, the continuous kneading apparatus comprising:
   a cylinder;
   a screw housed in the cylinder;
   a plurality of ring-shaped heaters arranged along a longitudinal direction of the cylinder so as to cover an outer peripheral surface of the cylinder;

a plurality of temperature sensors, each of the plurality of temperature sensors being configured to measure a temperature of a part of the cylinder heated by a respective one of the plurality of ring-shaped heaters; and a controller configured to perform feedback control for each of the plurality of ring-shaped heaters based on the temperature measured by a respective one of the plurality of temperature sensors, wherein resin pellets charged into the cylinder are kneaded by the screw while being heated by the plurality of ring-shaped heaters, and wherein the method comprises, for each of the plurality of ring-shaped heaters, the steps of:

(a) calculating, by the controller, a control error from the temperature measured by the temperature sensor;

(b) determining, by the controller, a current state and a reward based on the calculated control error;

(c) updating, by the controller, a control condition based on the determined reward and selecting an action corresponding to the current state under the update control condition, the updated control condition being a combination of a state and the selected action; and (d) controlling, by the controller, the respective ring-shaped heater based on the selected action, wherein the state represents a predetermined range of control error values, and the current state is the state that represents the range that includes the calculated control error, and the reward indicates appropriateness of the selected action selected in a previous state previous to the current state.

7. The method for controlling the continuous kneading apparatus according to claim 6, wherein the action selected in the step (c) is a change in an output of the target ring-shaped heater.

8. The method for controlling the continuous kneading apparatus according to claim 6, wherein the action selected in the step (c) is a change in a parameter of a PID controller configured to control an output of the target ring-shaped heater.

9. The method for controlling the continuous kneading apparatus according to claim 6, wherein each of the plurality of temperature sensors is a thermocouple.

10. The method for controlling the continuous kneading apparatus according to claim 9, wherein each of the thermocouples is inserted into a through hole formed in a respective one of the plurality of ring-shaped heaters, and is positioned so as to be in contact with the cylinder.

\* \* \* \* \*